June 27, 1961 T. W. WILLEMSE ET AL 2,990,502

METHOD OF ALLOYING A RECTIFYING CONNECTION TO A SEMI-CONDUCTIVE MEMBER, AND SEMI-CONDUCTIVE DEVICES MADE BY SAID METHOD

Original Filed Aug. 16, 1955 2 Sheets-Sheet 1

INVENTORS
THEO WILLEM WILLEMSE
JAN ADRIANUS MANINTVELD
BY [signature]
AGENT

INVENTORS
THEO WILLEM WILLEMSE
JAN ADRIANUS MANINTVELD
BY
AGENT

United States Patent Office 2,990,502

Patented June 27, 1961

2,990,502

METHOD OF ALLOYING A RECTIFYING CONNECTION TO A SEMI-CONDUCTIVE MEMBER, AND SEMI-CONDUCTIVE DEVICES MADE BY SAID METHOD

Theo Willem Willemse, Delft, and Jan Adrianus Manintveld, Eindhoven, Netherlands, assignors, by mesne assignments, to North American Philips Company, Inc., New York, N.Y., a corporation of Delaware Original application Aug. 16, 1955, Ser. No. 528,762. Divided and this application Mar. 3, 1958, Ser. No. 718,872

Claims priority, application Netherlands Aug. 26, 1954

16 Claims. (Cl. 317—240)

This invention relates to a method of alloying a rectifying connection to a semi-conductive member, and to semi-conductive devices made by said method. The application of this invention is a division of a prior copending application, Serial No. 528,762, filed August 16, 1955, and now abandoned.

In methods of the foregoing type, a quantity of metal is applied to the semi-conductive member, and the metal and member heated to a temperature at which they fuse together, after which the assembly is cooled. It is well known to use such a method, known as the "alloying" method, for manufacturing transistors and crystal diodes, in which event the semi-conductive member usually consists of germanium or silicon. The alloyed metal, which term as used herein not only means an element but also an alloy, must satisfy various requirements in order to be able to provide the desired rectifying contact to the semiconductor, which requirements are well known to the art. It need only be noted that for germanium, the metals most often used are indium or a lead-antimony alloy, whereas aluminum and a gold-antimony alloy are most frequently used for producing rectifying contacts on silicon.

The rectifying connections manufactured in this manner frequently exhibit certain undesired electrical properties, for example, recombination phenomena, which would appear to be due to mechanical stresses in the connection which are produced by differences in the coefficients of thermal expansion of the parts of which the connection is constituted. These parts are the initial semi-conductive member, the metal itself, and the junction produced between them. The production of these stresses will become evident from a consideration of the fact that the coefficients of expansion of the metals which are most frequently used are five to ten times greater than those of the semi-conductive materials. These disadvantages occur particularly when producing connections having a comparatively large surface area, for example, exceeding one square millimeter. In rectifying contacts, the presence of recombination phenomena are very inconvenient, since they produce a high leakage current; on the other hand, however, a high degree of recombination is desired in ohmic contacts to the semi-conductor.

A number of methods have been proposed to obviate these disadvantages. For instance, it has been suggested to use a metal having a coefficient of expansion equal to that of the semi-conductive member, or a metal of high ductility so that it can deform if any stresses are produced, or a metal having a melting point approximately at room temperature. All these suggestions restrict or limit the available metals to a high degree in fact, it is virtually impossible to find a metal from the small number remaining which also provides a satisfactory rectifying connection.

The chief object of the invention is to prevent the presence of these mechanical stresses without limiting the number of available metals in principle, and also to enable manufacturing rectifying contacts having a large surface area.

The invention is based on the realization that the occurrence of mechanical stresses at the junction of the metal with the semi-conductive member can be substantially prevented, even when there is a considerable difference in their coefficients of expansion, by sealing to the metal opposite the junction a member, hereinafter referred to as the compensator, of approximately the same coefficient of expansion as the semi-conductive member. Thus, the metal is arranged in a more or less symmetrical position between two members having approximately equal coefficients of expansion.

In particular, according to the invention, during the process of alloying the metal on one of its sides to the semi-conductive member to form a rectifying junction therebetween, to the other side of the metal is fused the compensator, of which its coefficient of expansion is as a maximum twice that of the semi-conductive member, in a manner such that the thickness of the metal layer is small relative to its diameter. Preferably, however, the coefficients of expansion are equal. In addition preferably the area through which the metal is sealed to the compensator is at least equal to that through which the metal is alloyed to the semi-conductive member. Finally, the absolute thickness of the metal layer is preferably less than 0.1 mm. The limits of the coefficient of expansion of the compensator are determined by the following considerations. Absolute equality of the coefficients of expansion would be most favorable; however, this can be achieved only by manufacturing the compensator and the semi-conductive member from the same material. However, a large technical improvement over the known constructions is attained without absolute equality. Frequently, contacts made, for example, of a lead-antimony alloy, e.g. containing 90% of lead, having a coefficient of expansion $\lambda$ being about $30\times10^{-6}$ are alloyed to germanium having a coefficient of expansion of only from 5.6 to $6\times10^{-6}$. In this event, the electrical properties of the rectifying contact are considerably improved by the use of a compensator in accordance with the invention having a coefficient of expansion of less than $\lambda=10\times10^{-6}$. For alloying contacts to silicon, which has a coefficient of expansion $\lambda$=from 2 to $4\times10^{-6}$, use is often made of aluminum having a $\lambda=28\times10^{-6}$. In this event, a great improvement is obtained by employing a compensator having a $\lambda=8\times10^{-6}$. An improvement is also achieved by the use of a compensator having a coefficient of expansion which is less than that of the semi-conductive member.

However, as indicated before, the most complete compensation is obtained by the use of a compensator made of the same material as the semi-conductive member or of a material which is chemically related thereto. The member and the compensator may thus each consist of germanium or silicon, but these elements may also be interchanged. This provides not only the advantage of a high degree of conformity of the coefficients of expansion, but also the advantage that the metal interposed between the two semi-conductive members on either side alloys itself to the same or approximately the same extent with each of said members, so that the symmetry is further improved and the occurrence of stresses further reduced. If, in this event, the semi-conductive compensator prevents the attachment of a current supply conductor to the metal contact in the usual manner, according to a further embodiment of the invention, the compensator, after the sealing process, can be removed, for example, by grinding or etching. However, it is advantageous to produce the compensator from a semi-conductive material of a conductivity type which is opposite to that of the semi-conductive member, whereas the resistivity of said compensator is less than that of the semi-conductive member. Thus, the metal sealed or fused to the semi-conductive member and producing a rectifying connection therewith, will produce an ohmic contact with the compensator, and a current supply wire can then be secured to the compensator without difficulty.

It should be noted that it is known to solder a semi-conductive member to a plate consisting of an alloy of 54% of iron, 29% of nickel and 17% of cobalt, which alloy is commercially known as "Fernico." The purpose here is to prevent the member from cracking. However, the contact produced with the semi-conductive member is not a rectifying contact but an ohmic contact. Moreover, no change in the recombination effect was observed. In addition, any reduction in the recombination effect would adversely affect the properties of the contact, for, in an ohmic contact, a high degree of recombination is desirable. Hence, that teaching is not useable in the invention.

In this connection, it should further be noted that the presence of a compensator in the proximity of the rectifying junction layer between the metal and the semi-conductive member enables satisfactory cooling at the point at which most of the heat is generated during the passage of current through the device. According to a preferred embodiment, the compensator, consequently, is designed as a cooling plate or is connected to a cooling plate.

The invention will now be explained with reference to the accompanying drawings, in which.

It will be observed that all of the figures are diagrammatic only and drawn on a large scale.

Figure 1:
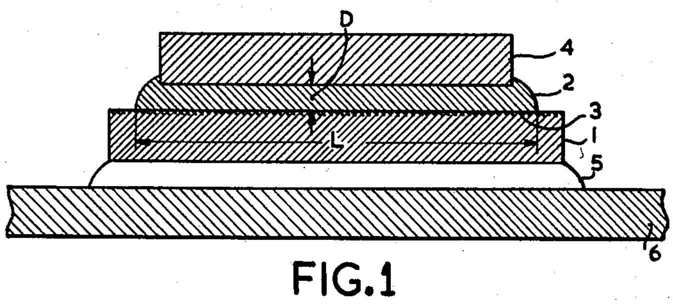
FIGS. 1 to 5 are cross-sectional views of various crystal diodes made in accordance with the invention.

Referring now to FIG. 1, the principal requirements to be satisfied when manufacturing a rectifying contact in accordance with the invention will now be described in connection with certain specific embodiments. There is provided a semi-conductive member 1, for example, a wafer of n-type germanium having a resistivity of 20 ohm-cm. cut from a monocrystal. To this member 1, an amount of metal 2, for example, indium, is alloyed, i.e., the indium 2 is fused to the germanium body 1 in the well-known alloying method for producing a p-n junction. For example, the wafer 1 on which the indium 2 is arranged is heated to 520° C. for about 5 minutes in a neutral atmosphere of hydrogen. During this method, it is assumed that a small amount of the underlying germanium is dissolved in the indium, and during cooling separates out and recrystallizes on the initial crystal lattice of the germanium body as a thin junction layer 3, which is indicated by cross-hatching in the figure. This layer 3 is of the p-conductivity type since indium is an acceptor; consequently, a rectifying p-n junction is produced. However, as has been mentioned hereinbefore, the coefficient of expansion of indium is about seven times that of germanium, with the result that, after cooling, mechanical stresses are produced in the proximity of and in the layer 3, which stresses adversely affect the electrical properties of the device.

If, now, according to the invention, during the process of fusing the metal 2 to the semi-conductive member 1, a compensator 4, for example, in the form of a disc, is sealed to the metal 2 at its side remote from the member 1—care being taken that the coefficient of expansion of the compensator differs only slightly from that of the member 1 and, in addition, that the thickness D of the remaining metal layer is small compared with the diameter L of this layer—the mechanical stresses in the layer 3 and in its proximity will have, to a great extent, disappeared. For example, the plate 4 may consist of molybdenum, which has a coefficient of expansion of about $5\times10^{-6}$. Also, as an example only, the thickness D of the metal layer 2 may be 25 microns, and the diameter or length L about 5 mm.

Figure 2:
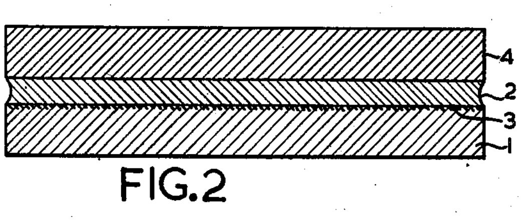

The edge of the metal layer 2 shown in FIG. 1 projects slightly below the compensater 4. When this uncovered edge of the metal layer is small, it will not produce appreciable stresses in the junction layer 3. Preferably, however, the compensator 4 is at least equal to the junction layer 3, i.e. the area through which the metal 2 is sealed to the member 1. This construction is shown in FIG. 2. At the bottom, the semi-conductive member 1 may be secured to a supporting or cooling plate 6 (FIG. 1) by means of solder 5 in the well-known manner. In the construction shown in FIG. 2, however, the compensator 4 itself may serve as the cooling plate.

Figure 3:
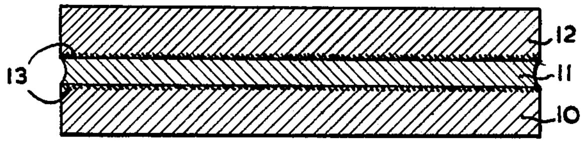
Figure 4:
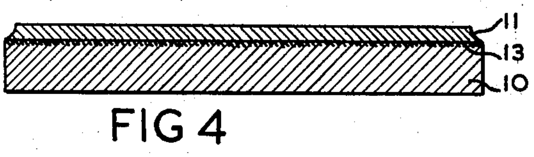

FIG. 3 shows a construction in which a semi-conductive member 10, consisting, for example, of silicon, is fused to an aluminum layer 11, the top of which is fused to a compensator 12 made of silicon or germanium. On opposite sides of the aluminum layer 11 a junction 13 is produced. The presence of the junction or the resistance of the compensator 12 may interfere with the provision of an ohmic contact to the metal layer 11. However, it was found that the electrical properties of the junction between the parts 10 and 11 are not affected if the compensator is removed, for example, by grinding after the completion of the device as shown in FIG. 3. The resultant construction is illustrated in FIG. 4. An ohmic contact is then readily made to the exposed layer 11.

Figure 5:
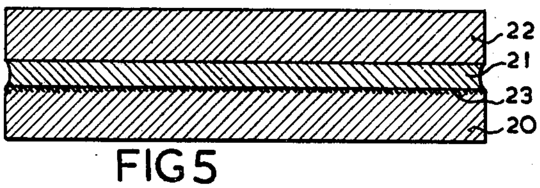

However, a proper choice of the semi-conductive material for the compensator enables the latter to be utilized for supplying current to the metal layer. For example, FIG. 5 shows a semi-conductive member 20 consisting of n-type silicon having a resistivity of about 2 ohm-cm. A layer of aluminum 21 is fused to said member, which layer is in turn fused to a compensator 22 made of silicon. The latter silicon material 22 may have a very low resistivity (high conductivity) of, say, 0.01 ohm-cm. and be of p-type conductivity. Thus, a rectifying p-n junction is produced only at 23 at the bottom of the metal layer 21, whereas the interface between the parts 22 and 21, is not rectifying but ohmic. Ohmic contacts can then be soldered to the parts 20 and 22 in the usual manner.

Similarly, to a semi-conductive member of p-type conductivity, a metal layer consisting of an alloy of gold and arsenic can be alloyed. This layer may be fused to a compensator consisting of n-type silicon of low resistivity.

Figure 6:
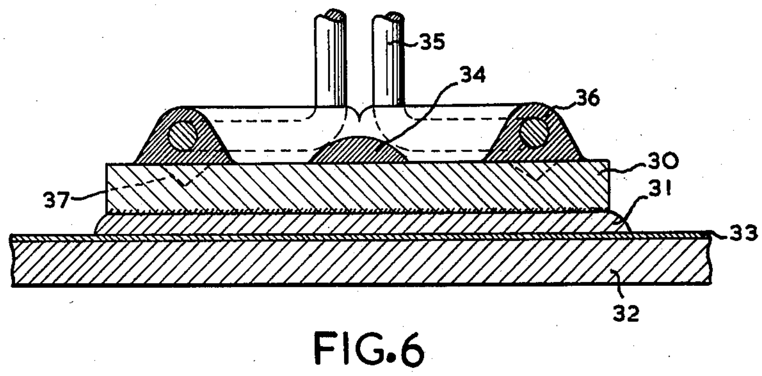
FIG. 6 is a cross-sectional view of a transistor in accordance with the invention.

Fig. 6 shows a transistor. The latter comprises a semi-conductive member 30 of n-type germanium which is provided at the bottom with a rectifying connection constituted by a metal layer 31 alloyed to it and also to a compensator 32. This compensator 32 consists of a plate of molybdenum having a coefficient of expansion $\lambda=4.9\times10^{-6}$, which plate at 33 is gold-plated to improve the adherence to the metal layer 31, which consists of indium. The contact 31 serves as the collector. In addition, to the semi-conductive member 30 are fused an emitter 34, which also consists of indium, and an ohmic base contact constituted by a wire 35 bent to form a substantially closed ring and coated with a layer of solder 36 consisting of an alloy of gold, germanium and antimony. A practical method of providing this contact consists of providing a wire 35 having a coefficient of expansion $\lambda=4$ to 6 times $10^{-6}$, which wire is gold-plated throughout its length and is made of "Fernico," dipping its lower end into a molten alloy of gold, germanium and antimony containing 13% germanium and 4% antimony, and subsequently securing it on the member 30. In order to facilitate correct positioning of this contact, the member 30 may have a circular groove 37 formed in it, which is shown by broken lines in the figure. When the member 30 consists of germanium of the p-conductivity type, the parts 31 and 34 can be made of a lead-antimony allow ($\lambda=29\times10^{-9}$), and the solder 36 of an alloy of gold, germanium and indium.

It should be noted that in this transistor, the contact 31 only should be considered as alloyed by carrying out the method in accordance with the invention. Though the base contact 35—36 comprises the wire 35, which has substantially the same coefficient of expansion as the semi-conductive member, the solder 36 is not provided as a thin layer, so that any stresses produced at the junction of the parts 36 and 30 are not compensated. In addition, this contact is ohmic and not rectifying.

Figure 7:
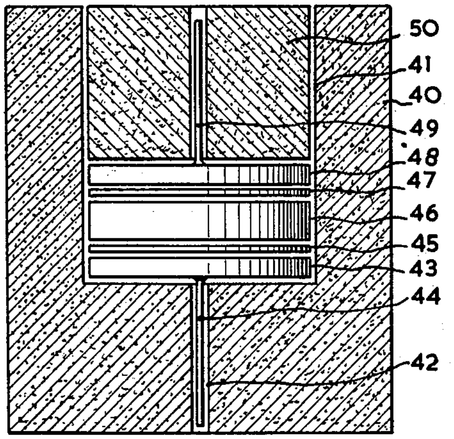
FIG. 7 is a sectional view showing the parts of a diode during the sealing process.
Figure 8:
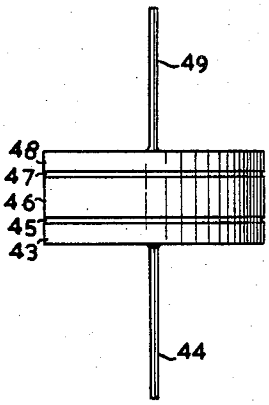
FIG. 8 shows the product obtained after the sealing process shown in FIG. 7 is consummated.

As a material for the compensator, use may advantageously be made, in combination with semi-conductive members of germanium and silicon, of the non-radioactive transition metals from the sixth group of the periodic system, i.e., chromium, molybdenum and tungsten, which have coefficients of expansion approximately that of the above-noted semi-conductive members. An example of such use will be described with reference to FIGS. 7 and 8. In a block of graphite 40, a cylindrical cavity 41 of diameter 3.5 mms. is bored, which at the lower end terminates in a narrow aperture 42. In the cavity 41, a gold-plated disc of tungsten 43

$$(\lambda=4.2\times10^{-6})$$

is arranged, to the bottom of which a nickel-iron wire 44 is welded, which is disposed in the aperture 42. On top of this tungsten disc, a 25 microns thick gold disc 45 is disposed. On top of the gold disc, a 100 microns thick disc 46 of n-type silicon having a resistivity of 2 ohm-cm. is arranged. The silicon 46 is covered by a 25 microns thick aluminum disc 47, the metal layer forming the rectifying junction, and a second tungsten disc 48. The latter disc 48 consists of sintered tungsten which is impregnated with aluminum having 1% of silicon added to it to improve the adherence. The resultant coefficient of expansion is about the same order as that of the silicon. The disc 48 is again provided with a supply wire 49. The entire stack is weighted by means of a bored weight 50 made of graphite. The assembly, which may be further compressed by means of a spring (not shown), is arranged in a furnace and heated to a temperature of 750° C. in an atmosphere containing 80% of nitrogen and 20% of hydrogen at a pressure of 760 mms. of mercury for a period of 15 minutes. After the usual etching process, which may be carried out in a mixture of 15 ccs. of acetic acid, 15 ccs. of 48% hydrofluoric acid, and 25 ccs. of 70% nitric acid, the diode or rectifier shown in FIG. 8 is obtained, in which the tungsten disc 48 is the compensator which suppressed the stresses between the metal layer 47 and the member 46.

While we have described our invention in connection with specific embodiments and applications, other modifications thereof will be readily apparent to those skilled in this art without departing from the spirit and scope of the invention as defined in the appended claims.

What is claimed is:

1. A method of producing a rectifying connection to a semi-conductive member selected from the group consisting of germanium and silicon, comprising the steps of fusing an impurity-bearing metal member whose expansion coefficient is substantially greater than that of the semi-conductive member and having a small thickness relative to its diameter on one of its sides to the semi-conductive member to produce a p-n junction therebetween, simultaneously fusing the metal member on its opposite side to a compensator member selected from the group consisting of silicon and germanium and having a coefficient of expansion approximating that of the semi-conductive member, whereby the establishment of stresses in or near the junction is prevented, and thereafter removing the compensator member to expose the metal member.

2. A method as claimed in claim 1 in which the compensator is removed by a grinding operation.

3. A semi-conductor device comprising a wafer-shaped semi-conductive member selected from the group consisting of germanium and silicon, a thin, impurity-bearing, metal member having a small thickness relative to its diameter fused along a flat surface to said semi-conductive member to form a broad area rectifying junction thereat, said impurity-bearing metal member having a substantially higher expansion coefficient than that of the semi-conductive member and thus tending to establish stresses in or near the rectifying junction, and a compensator metal member also selected from the group consisting of germanium and silicon fused to the opposite flat surface of the impurity-bearing metal member to avoid the establishment of said stresses, said compensator member possessing a high conductivity and forming an ohmic contact with the impurity-bearing metal member.

4. A device as set forth in claim 3 wherein the fused surface area of the compensator member and impurity-bearing metal member is at least equal to that of the latter and the semi-conductive member.

5. A method of producing a rectifying connection to a semi-conductive member selected from the group consisting of germanium and silicon, comprising the steps of fusing an impurity-bearing metal member whose expansion coefficient is substantially greater than that of the semi-conductive member and having a small thickness relative to its diameter on one of its sides to the semi-conductive member to produce a p-n junction therebetween, simultaneously fusing the metal member on its opposite side to a compensator member selected from the group consisting of semi-conductive silicon and germanium and having a coefficient of expansion approximating that of the semi-conductive member and also having the same type of conductivity as the semi-conductive member, whereby the establishment of stresses in or near the junction is prevented, thereafter removing the compensator member to expose the metal member, and thereafter effecting contact to an exposed portion of the metal member.

6. A semi-conductor device comprising a wafer-shaped semi-conductive member selected from the group consisting of germanium and silicon, a thin, impurity-bearing, metal member having a small thickness relative to its diameter fused along a flat surface to said semi-conductive member to form a broad area rectifying junction thereat, said impurity-bearing metal member having a substantially higher expansion coefficient than that of the semi-conductive member and thus tending to establish stresses in or near the rectifying junction, and a compensator metal member also selected from the group consisting of germanium and silicon fused to the opposite flat surface of the impurity-bearing metal member to avoid the establishment of said stresses, said compensator member possessing a resistivity that is substantially less than that of the semi-conductive member and being of a conductivity type opposite to that of the semi-conductive member to thereby form an ohmic contact with the metal member.

7. A device as set forth in claim 6 wherein the semi-conductive member and the compensator are of the same material.

8. A method for joining a silicon body to a molybdenum body to establish a low resistance contact therebetween comprising assembling a silicon body and a molybdenum body with a layer of a material consisting predominantly of gold therebetween in intimate contact therewith and heating the assembly at a temperature below the melting point of the gold-containing material in a non-oxidizing atmosphere and in the absence of a fluxing agent to form a gold-silicon alloy and to bond said silicon and molybdenum bodies together.

9. A method according to claim 8 wherein said assembly is heated to a temperature above the eutectic temperature of the gold-silicon alloy and below the melting point of the silicon and molybdenum bodies.

10. In a method for producing a junction type semiconductor unit consisting of an assembly of a base plate of molybdenum, a body of semiconductive silicon having a face thereof adjacent said base plate, and a layer of a junction-forming significant impurity material in intimate contact with an opposite face of said silicon, the steps of disposing a layer of a material consisting predominantly of gold between said base plate and said silicon face and in intimate contact therewith to form part of said assembly, and heating said assembly at a temperature below the melting point of the gold-containing material simultaneously to form a rectifying junction on the opposite face of said silicon and to bond said silicon and molybdenum bodies together.

11. A method according to claim 10 wherein said heating step is at a temperature of approximately 750° C.

12. A molybdenum-silicon structure comprising a silicon body, a molybdenum body adjacent said silicon body and a layer of a material consisting predominantly of gold disposed therebetween and in intimate contact therewith joining said bodies to form an adherent bond.

13. A silicon power rectifier comprising a base plate of molybdenum, a body of semi-conductive silicon having a face thereof adjacent said base plate, a layer of a material consisting predominantly of gold disposed between said silicon face and said molybdenum and in intimate contact therewith, and a layer of a junction-forming significant impurity material in intimate contact with an opposite face of said silicon.

14. A silicon structure comprising a silicon body, a body selected from the group consisting of molybdenum, tungsten and chromium adjacent said silicon body, and a layer of a material consisting predominantly of gold disposed therebetween and in intimate contact therewith joining said bodies to form an adherent bond.

15. A silicon power rectifier comprising a base plate of a material selected from the group consisting of molybdenum, tungsten and chromium, a body of silicon having a face thereof adjacent said base plate, a layer of material consisting predominantly of gold disposed between said silicon face and said base plate and in intimate contact therewith joining said bodies to form an adherent bond, and a layer of junction-forming significant impurity material in intimate contact with an opposite face of said silicon.

16. In a method for producing a junction type semiconductor unit consisting of an assembly of a base plate of a material selected from the group consisting of molybdenum, tungsten and chromium, a body of semiconductive silicon having a face thereof adjacent said base plate, and a layer of junction-forming significant impurity material in intimate contact with an opposite face of said silicon, the steps of disposing a layer consisting predominantly of gold between said base plate and said silicon face and in intimate contact therewith to form part of said assembly, and heating said assembly at a temperature below the melting point of the gold-containing material but above the eutectic temperature of the gold-silicon alloy simultaneously to form a rectifying junction on the opposite face of said silicon and to bond said silicon body and base plate together.

References Cited in the file of this patent

UNITED STATES PATENTS

| | | |
|---|---|---|
| 2,701,326 | Pfann | Feb. 1, 1955 |
| 2,702,360 | Giacoletto | Feb. 15, 1955 |
| 2,730,663 | Harty | Jan. 10, 1956 |